United States Patent [19]

Reinhold et al.

[11] 4,454,766
[45] Jun. 19, 1984

[54] MEASURED VALUE RECORDING DEVICE FOR MAGNETIC-INDUCTIVE FLOW METERS

[75] Inventors: Immo Reinhold, Duisburg, Fed. Rep. of Germany; Wouter T. Tromp, Sliedrecht, Netherlands

[73] Assignee: Rheometron AG, Switzerland

[21] Appl. No.: 299,600

[22] Filed: Sep. 4, 1981

[30] Foreign Application Priority Data

Sep. 4, 1980 [EP] European Pat. Off. .... EP 80200828.4

[51] Int. Cl.³ ............................................... G01F 1/58
[52] U.S. Cl. .................................................. 73/861.12
[58] Field of Search ........................... 73/861.12, 861.13

[56] References Cited

U.S. PATENT DOCUMENTS

| | | | |
|---|---|---|---|
| 3,180,144 | 5/1961 | Bennett | 73/861.12 |
| 4,065,965 | 1/1978 | Ackerman et al. | 73/861.12 |
| 4,098,118 | 7/1978 | Schmoock | 73/861.12 |
| 4,214,477 | 7/1980 | Schmoock | 73/861.12 |
| 4,253,340 | 3/1981 | Schmoock | 73/861.12 |

FOREIGN PATENT DOCUMENTS

| | | | |
|---|---|---|---|
| 1573006 | 12/1970 | Fed. Rep. of Germany | ... 73/861.12 |
| 2040682 | 9/1977 | Fed. Rep. of Germany | ... 73/861.12 |

*Primary Examiner*—Charles A. Ruehl
*Attorney, Agent, or Firm*—Cesari and McKenna

[57] ABSTRACT

A measured value recording device for magnetic-inductive flow meters includes a ferromagnetic jacket which snugly encircles an electrically insulating tube piece through which fluid can flow. Measuring electrodes are located in diametrically opposite bores in the tube piece and magnet coils are positioned in diametrically opposite radial recesses in the jacket with their inner ends projecting into holes in the tube piece to releasably lock together the jacket and tube piece.

9 Claims, 6 Drawing Figures

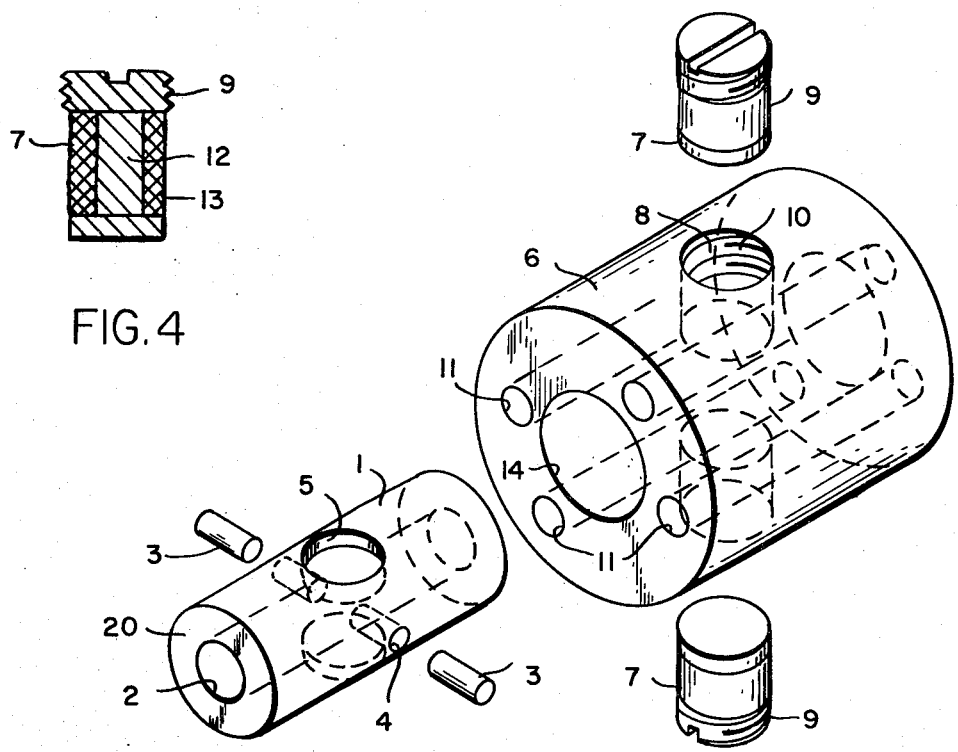
FIG. 4
FIG. 1
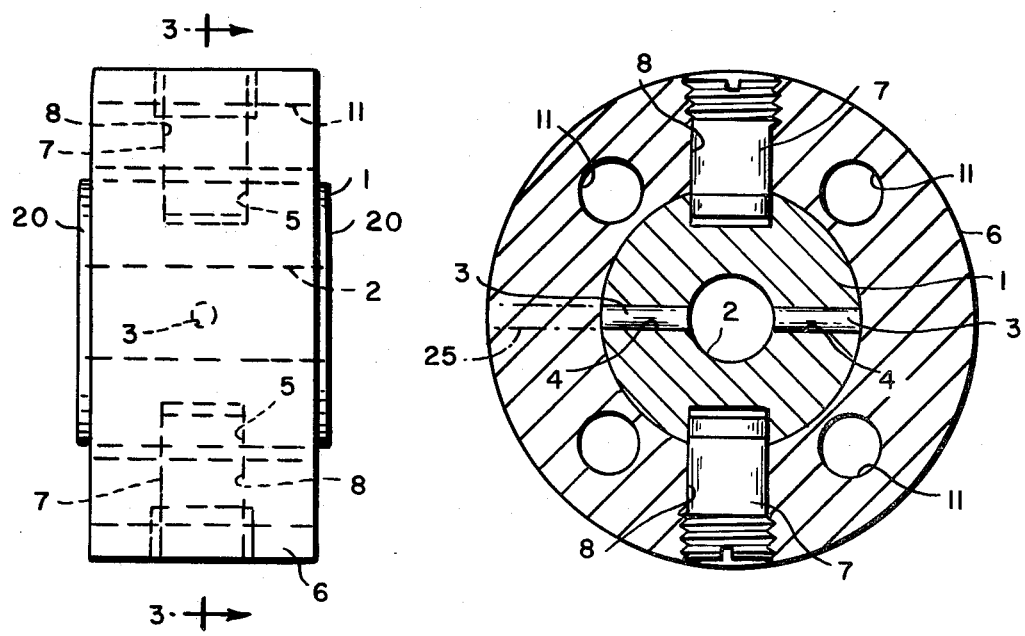
FIG. 2
FIG. 3

4,454,766

MEASURED VALUE RECORDING DEVICE FOR MAGNETIC-INDUCTIVE FLOW METERS

This invention relates to a measured value recording device for magnetic-inductive flow meters. It pertains more particularly to a device of this type having a cylindrical jacket of ferromagnetic material, a tubular piece of an electrically nonconductive material axially inserted into the jacket and through which fluid flows, measuring electrodes that are arranged in diametrically opposite bore holes in the tubular piece, and magnet coils that are affixed with their coil cores at diametrically opposite positions on the jacket and that are connected to a power source in order to create a magnetic field that penetrates the tubular piece transversely to the direction of fluid flow.

BACKGROUND OF THE INVENTION

Apparatus of this general type is well known. U.S. Pat. No. 4,098,118 discloses a measured value recording device wherein two radially inwardly directed magnetic coils are bolted to the internal surface of a relatively thin cylindrical jacket at diametrically opposite positions therein. There is further provided in that device a plastic tube through which flows the medium being measured. The outside diameter of the tube is substantially smaller than the inside diameter of the jacket and the tube carries at one end a flange limiting at one end the cavity between the tube and the jacket. Molded onto the outer jacket of the likewise relatively thin plastic tube are radially outwardly directed sockets defining bore holes for taking up the electrodes.

After affixing the magnet coils inside the jacket of that prior device, the plastic tube provided with the electrodes is inserted into the jacket. Then the relatively broad cavity between the tube and jacket is filled with a grout of plastic material, whereby the magnet coils and the measuring electrodes are embedded in the grout mass. This construction has all of the disadvantages that arise with the casting, or injection molding, respectively, of plastic masses. Furthermore, after the grouting, the measuring electrodes and coils are inaccessible so that in case of a defect in one of these components, as a rule, the whole device has to be replaced.

In another conventional construction described in U.S. Pat. No. 3,924,466 there are provided particularly flat magnet coils which consist of thin, flexible plastic foils forming thin current conductor paths. These plastic foils are affixed to the outer jacket of a plastic tube and inserted with this tube in a cylindrical jacket of ferromagnetic material. Diametrically opposite measuring electrodes are positioned in radial bore holes extending through the jacket, the flat magnet coils and the plastic tube. There are further provided in that device connector bolts, extending through the jacket for the current conductor paths of the magnet coils. For a short-circuit of the magnetic field there are either wound several layers of a metal foil or a plastic tube made out of Duroplast is chosen that is heated after insertion into the jacket in order to press the magnet coils tightly against the jacket which then acts as a magnetic field short-circuit. That prior design permits mechanical assembly of the component parts of the device only in connection with special flat foil-like magnet coils; it is wholly unsuitable for installing conventional magnet coils.

In case there is very little space available between the flanges of the tubing for taking up the measured value recording device then German OS No. 15 73066 proposes an especially narrow construction wherein the measured value recording device is formed in the shape of a flange consisting of an insulating material which contains the electrodes and radially inserted magnetic poles, whereby a curved yoke around the flange is provided with a magnet coil. That prior device produces an unfavorable distribution of the magnetic field. Also it requires excessive space in radial direction for accommodating the magnetic components. That is, it often extends out beyond the bounds of the fluid tubes to which it is connected.

SUMMARY OF THE INVENTION

The present invention aims to provide a measured value recording device of this general type whose component parts can be mechanically assembled very easily, with the tubular piece that is inserted into the jacket fixed in its position to the jacket.

Another object is to provide such a device whose component parts can be disassembled very easily for purposes of maintenance and repair.

A further object is to provide such a device which is especially compact.

Yet another object is to provide a device of this type which is composed of only six parts which are easily assembled without any special tools.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

The above objects are achieved in that the external diameter of the tubular piece corresponds to the nominal width (i.e. inside diameter) of the jacket so that the piece fits snugly in the jacket and in that the magnet coils are inserted from the outside into radial recesses of the jacket and project into registering blind holes of the tubular piece in which are arranged the bore holes that receive the measuring electrodes.

This construction has, to begin with, the advantage that it reduces the number of constructional units to the basic elements required for a measured value recording device, namely: the tubular piece of insulating material, the two measuring electrodes, the jacket of ferromagnetic material and the two spatially included magnet coils. The assembly of these constructional units is especially simple since the tubular piece equipped with the measuring electrodes merely has to be inserted axially into the jacket and the magnet coils have only then to be introduced into the jacket recesses to lock all these parts together.

Another essential advantage derives from the fact that the jacket takes over the funcion of the short-circuit element for the magnetic field and of the external housing. It serves also as a carrier for the magnet coils, thus uniting three functions or three constructional elements into one. The tubular piece of insulating material, on the other hand, takes over the carrying function of the whole device and serves for connection to the product tubes.

Since, after insertion of the tube piece into the jacket, the magnet coils introduced from the outside are projecting into blind holes of the tube piece, the tubular components are fixed against axial shifting and against rotation. The overall measured value recording device is thus particularly compactly designed and does not extend in a radial direction beyond the dimensions of the connector flanges of the product tubes. Furthermore, for purposes of maintenance or repair, a quick dismantling of the device is possible.

In order to fix the magnetic coils in the jacket, the recesses in the jacket can be provided with internal threads into which are screwed the magnet coils provided with a screw head. But also fixing of the coils through clamping elements or grouting is possible.

The mounting of the measuring electrodes can be carried out in many ways. Either the measuring electrodes can be embedded in the mass of the relatively thickwalled tubular piece, or they may be inserted from the outside of the device through bore holes formed in the jacket into the radial holes or into blind holes in the tubular piece. In the latter case, of course, the mounting of the measuring electrodes takes place only after the tubular piece has been inserted into the jacket. When the bores or holes in the tubular piece are formed as blind holes, then the electrodes are insulated against the measured fluid and form capacitive measuring electrodes.

BRIEF DESCRIPTION OF THE DRAWINGS

For a fuller understanding of the nature and objects of the invention, reference should be had to the following detailed description, taken in connection with the accompanying drawings, in which:

FIG. 1 is an exploded perspective view of a measured value recording device for a magnetic-inductive flowmeter embodying our invention;

FIG. 2 is a side elevational view of the FIG. 1 device;

FIG. 3 is a sectional view along line 3—3 of FIG. 2;

FIG. 4 is a sectional view of a magnet coil used in the FIG. 1 device;

DESCRIPTION OF THE PREFERRED EMBODIMENTS

The measured value recording device as shown in FIGS. 1 to 3 consists essentially of a tube piece 1, two measuring electrodes 3, a jacket 6 and two magnet coils 7.

Figure 5:
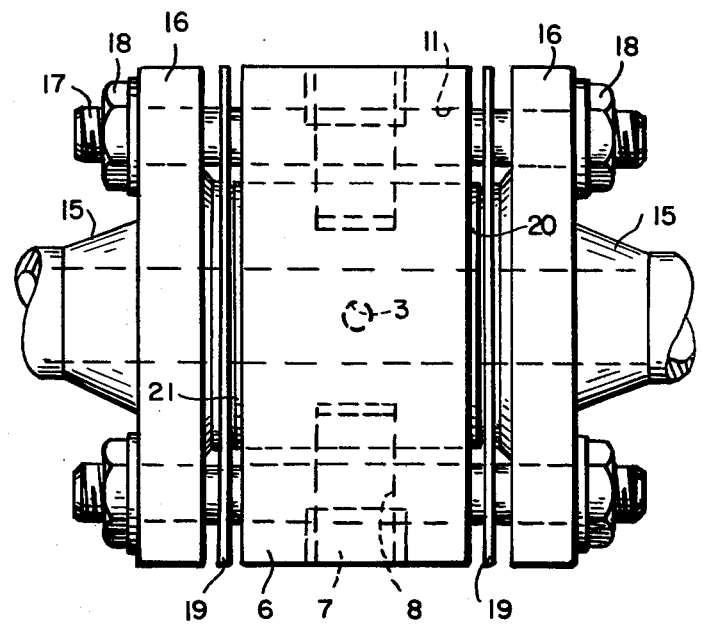
FIG. 5 is a side elevational view showing the attachment of the FIG. 1 measured value recording device between two connecting tubes.

The tube piece 1 through whose flow passage 2 flows the measured liquid is made of an electrical insulating material, such as ceramic, glass or plastic, that may also be glass fiber reinforced. The inside diameter of the flow passage 2 corresponds to the nominal width, i.e. the inside diameter of the connecting tubes 15 (FIG. 5). At the side of tubular piece 1 exist diametrically opposite bores 4 or corresponding holes molded into the tube piece during its manufacture. The two measuring electrodes 3 are introduced into these bores and fixed. For the fixing and sealing of the electrodes against fluid flow from passage 2 there may be provided screw threads in the bores or clamping and sealing rings or grout masses (not depicted in the drawings).

At right angles to the bores 4 are arranged or molded in piece 1 radially guided blind holes 5 which in each case receive the front end of a magnet coil 7. The wall thickness of the tube piece 1 is, depending on the strength of the material, relatively great. A tube piece 1 of plastic can be made by injection molding or the like whereby bores 4 and blind holes 5 can be formed in the piece at the same time. It is also possible to embed the measuring electrodes 3 in the piece at the outset during the injection molding process.

The jacket 6 consists of a ferromagnetic material. In design, it forms a hollow cylinder with a through hole 14 for the tube piece 1, whereby the jacket inner diameter and the tube piece outer diameter substantially correspond to one another so that the two parts fit snugly together. Two diametrically opposite recesses 8 are formed in the jacket, each being provided with an internal thread 10. In the jacket 6 are further provided four axially extending through passages 11. The axial length of the jacket 6 is somewhat shorter than that of the tube piece 1 so that the ends 20 of the tube piece 1 project somewhat beyond the ends of the jacket. Obviously, when the jacket 6 is made from a ferromagnetic cast material, then the aforementioned holes 14, recesses 8 and passages 11 can be molded in at the time of casting.

The assembling of the measured value recording device is accomplished through simple insertion of the tube piece 1 which is provided with the measuring electrodes into the jacket 6. Then it only remains to screw the two magnet coils 7 provided with screw heads 9 into the jacket recesses 8. When seated, they project into the blind holes 5 of the tube piece 1 and thus simultaneously secure the constructional parts against axial displacement and against turning.

The magnet coils 7 have, as shown in FIG. 4, a curved coil core 12, around which lies the coil winding 13. The coil cores 12, the screw heads 9 and the ferromagnetic jacket 6 form together the magnetic field short-circuit element or path.

Figure 6:
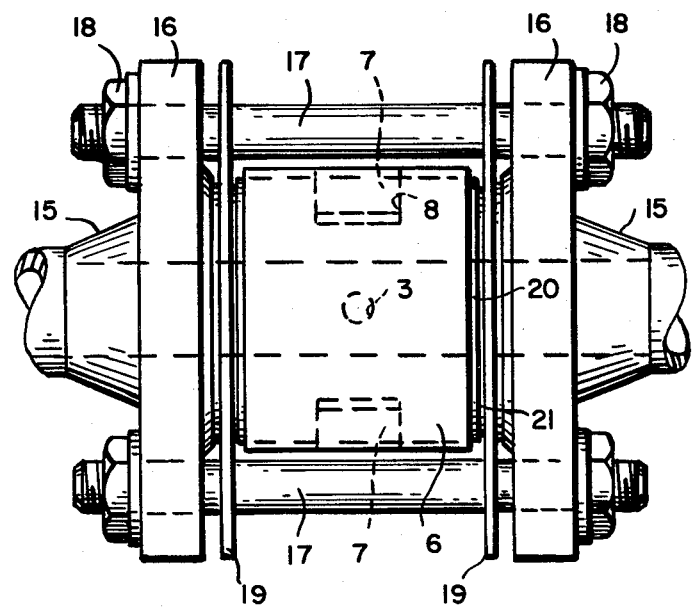
FIG. 6 is a similar view showing a modified embodiment of our measured value recording device between two connecting tubes.

The above described measured value recording device is positioned, as FIG. 5 shows, between the flanges 16 of the connecting tubes 15 associated with a product line. It is braced and clamped there by means of longitudinal bolts 17 extending through the tube flanges 16 and jacket passages 11 and by nuts 18 tightened on the ends of the bolts. Also, conventional earth rings 19 may be interposed between the flanges 16 and the recording device. The tube piece 1, sealingly braced in this manner, carries the other constructional parts of the measured value recording device. In the example shown in FIG. 5, the four longitudinal bolts 17 project through the four passages 11, whereas in the example of FIG. 6, passages 11 are omitted and the bolts extend outside of the jacket 6. When earth rings 19 are provided, then sealing rings 21 shown in FIG. 5 have to be inserted between them and the respective flanges 16. But if no earth rings are required and if the tube piece 1 is of plastic, then no sealing rings are needed because the projecting ends 20 of the tube piece abut and seal against the flanges 16.

The illustrated novel construction can be modified in many ways. Instead of just two magnet coils 7, there may be provided more magnet coils in pairs lying side-by-side in order to form certain magnetic fields. Also, instead of the mentioned screw mounting of the magnet coils 7, they can be fixed in their recesses by other means such as clamping elements or through casting in the recesses.

There are likewise different possible arrangements for the electrodes. For example, after the insertion of the tube piece 1 into jacket 6, the measuring electrodes can be introduced into bores 4 through registering bores radially arranged in the jacket (one is shown in dotted lines at 25 in FIG. 3) and be fixed there through screwing, clamping, casting or grouting. They can furthermore be designed as capacitative electrodes, whereby the bore holes 4 are made as blind holes. Also holders or traverses can be arranged or molded onto the jacket 6 that serve for the attachment to the device of a clamp housing or of a measuring transducer. Finally, the jacket 6 may also have a semi-shell-like design.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. In a measured value recording device for magnetic inductive flow meters of the type including a cylindrical jacket (6) of a ferromagnetic material, a tube piece (1) of an electrically insulating material axially inserted in the jacket (6), measuring electrodes (3) arranged in diametrically opposite bores (4) of the tube piece (1) and magnet coils (7) affixed with their coil core (12) diametrically opposite at the jacket (6) and connected to a power source in order to create a magnetic field penetrating substantially transverse to the longitudinal axis of the tube piece, the improvement wherein
   A. the jacket (6) snugly encircles the tube piece (1);
   B. a pair of diametrically opposite radial recesses (8) are formed in the jacket;
   C. a pair of holes (5) are formed in the tube piece in register with the jacket recesses; and
   D. the magnet coils (7) are positioned in the recesses (8) with their inner ends projecting into said holes (5) of the tube piece.

2. The measured value recording device according to claim 1, characterized in that the magnet coils (7) are threadedly engaged in the jacket recesses (8).

3. The device according to claim 2 wherein the magnet coils (7) are provided with tool-engagable heads (9).

4. The measured value recording device according to claim 1 or 2, wherein the measuring electrodes (3) are embedded in the mass of the tube piece (1).

5. The device according to claim 1 or 2 wherein
   A. the jacket (6) includes bores (25) in register with the tube piece bores (4), and
   B. the measuring electrodes (3) are received through the jacket bores into the tube piece bores.

6. The device according to claim 1 or 2 wherein the holes (5) in the tube piece (1) are blind holes.

7. The device according to claim 1 or 2 and further including a plurality of lengthwise bolt-receiving passages (11) in the jacket.

8. The device according to claim 1 or 2 wherein the outside diameter of the tube piece (1) is substantially uniform along its length and substantially corresponds to the inside diameter of the jacket (6).

9. The device according to claim 1 or 2 wherein the bores (4) in the tube piece (1) are blind holes.

* * * * *